United States Patent [19]
Baker et al.

[11] Patent Number: 5,848,464
[45] Date of Patent: Dec. 15, 1998

[54] APPARATUS FOR CLINCHING REACTION PLATE TABS OF AIR BAG MODULES

[75] Inventors: William F. Baker, Scottdale; Robert A. Rhinefrank, Phoenix; Larry P. Hulsey, Peoria, all of Ariz.

[73] Assignee: Automated Solutions, Inc., Tempe, Ariz.

[21] Appl. No.: 556,121

[22] Filed: Nov. 9, 1995

Related U.S. Application Data

[63] Continuation of Ser. No. 262,915, Jun. 21, 1994, abandoned.

[51] Int. Cl.$^6$ ........................................... B23P 11/00
[52] U.S. Cl. ................................. 29/822; 29/243.5
[58] Field of Search ................ 29/243.5, 243.517, 29/243.518, 513, 822

[56] References Cited

U.S. PATENT DOCUMENTS

| | | | |
|---|---|---|---|
| 3,364,557 | 1/1968 | Ashworth et al. | 29/243.5 |
| 3,440,706 | 4/1969 | Ostergren et al. | 29/243.5 |
| 4,823,455 | 4/1989 | Desiro | 29/243.5 |
| 5,141,247 | 8/1992 | Barth | 29/513 X |
| 5,237,734 | 8/1993 | Polon | 29/513 |
| 5,291,644 | 3/1994 | Musil | 29/243.5 X |

*Primary Examiner*—Joseph M. Gorski
*Attorney, Agent, or Firm*—Parsons & Goltry; Robert A. Parsons; Michael W. Goltry

[57] ABSTRACT

An automated clinching apparatus for securing a decorative cover to a reaction plate, forming an air bag module, the reaction plate including a plurality of tabs received by the decorative cover and clinched to secure the decorative cover to the reaction plate. The automated clinching apparatus includes a clamp assembly configured to engage and hold the air bag module, and a tab clinch assembly positioned adjacent the clamp assembly for automatically clinching the tabs of the reaction plate.

17 Claims, 9 Drawing Sheets

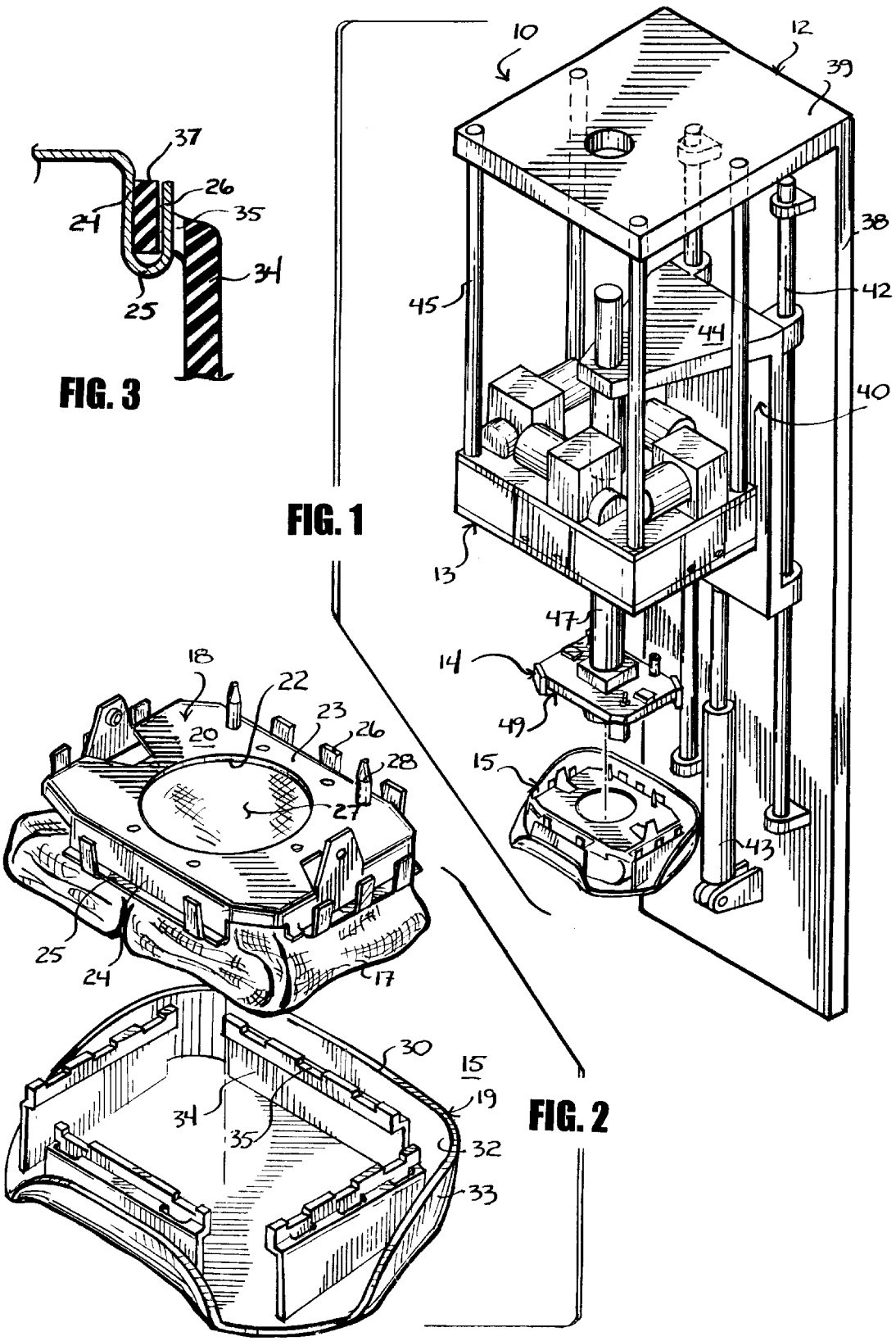

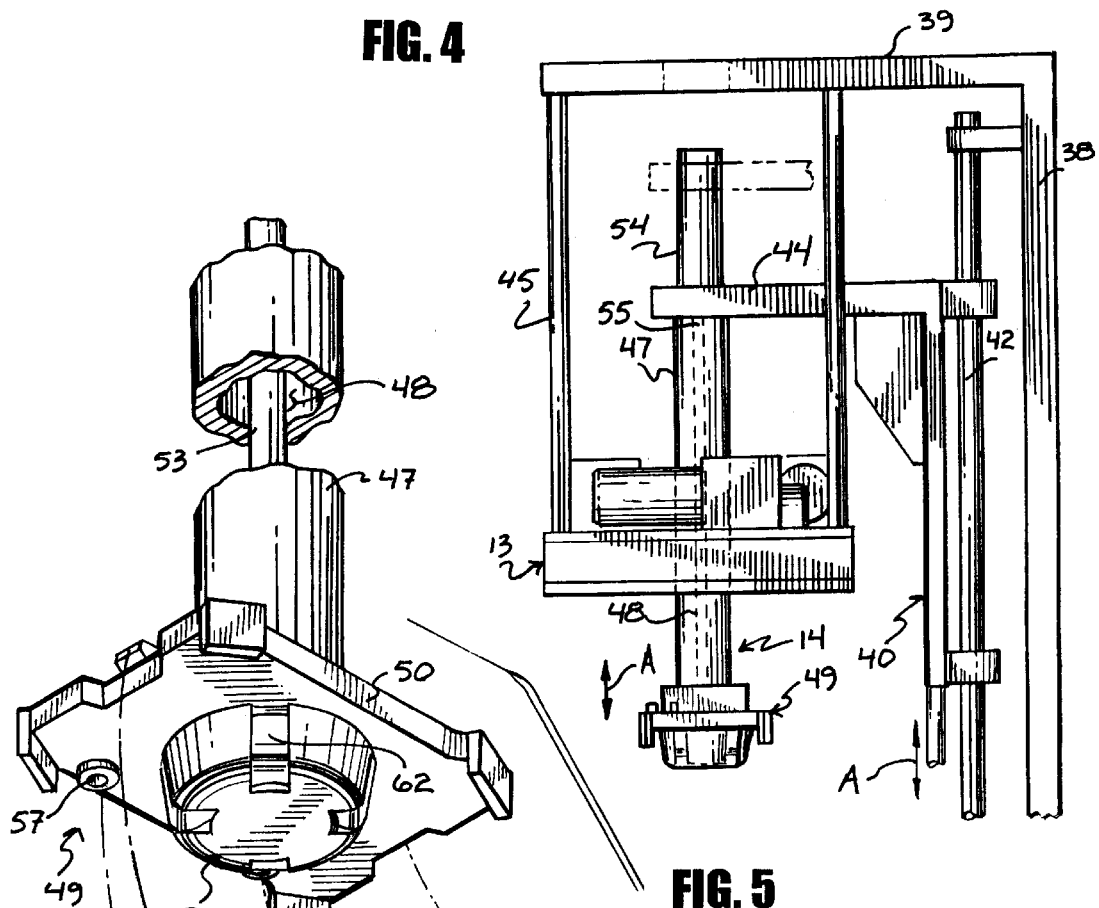
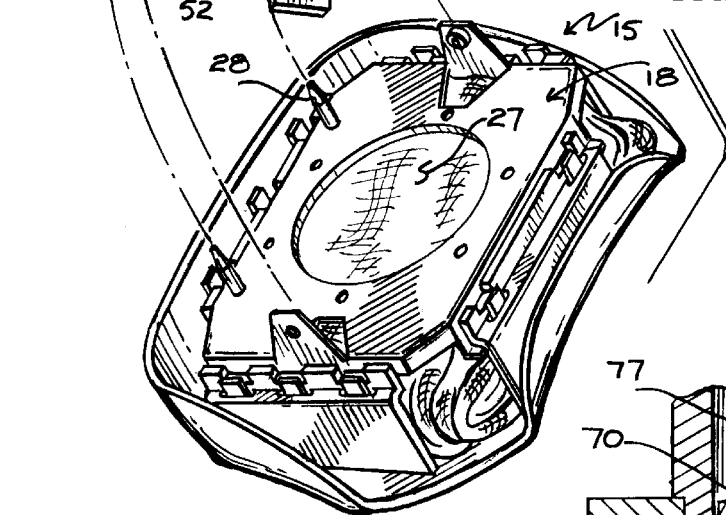
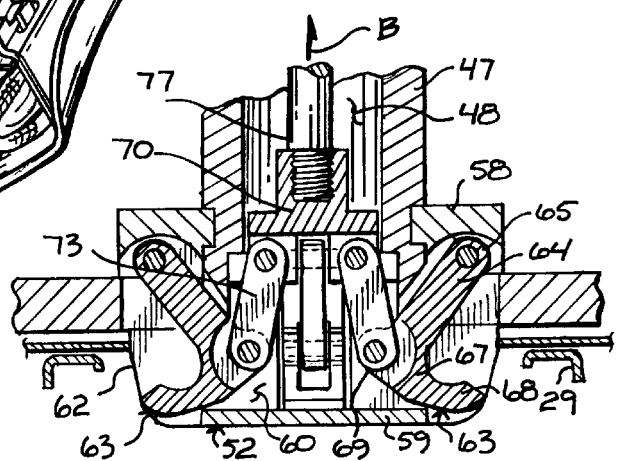

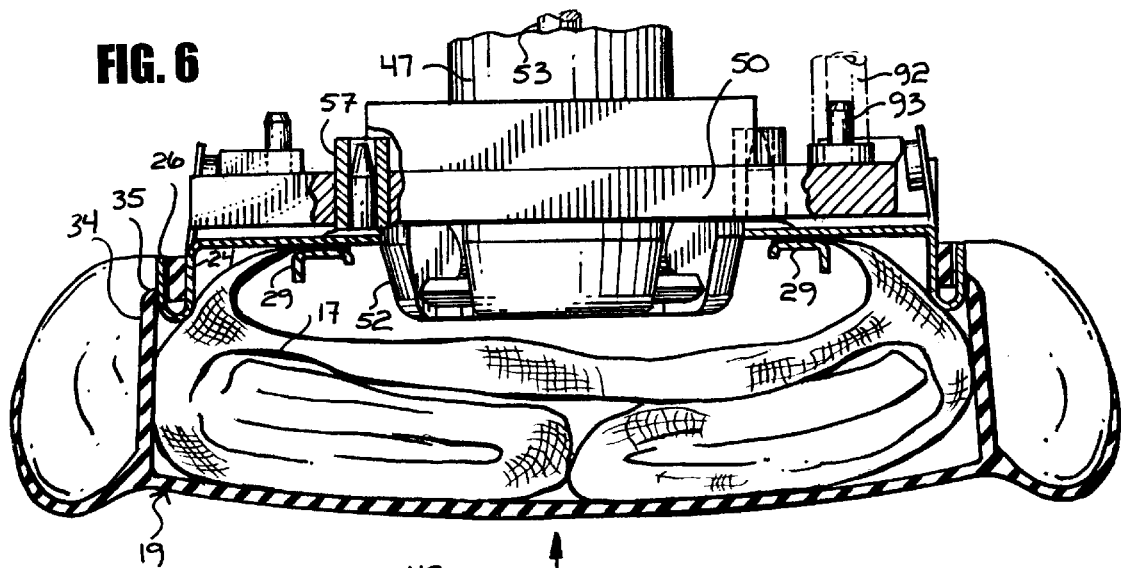
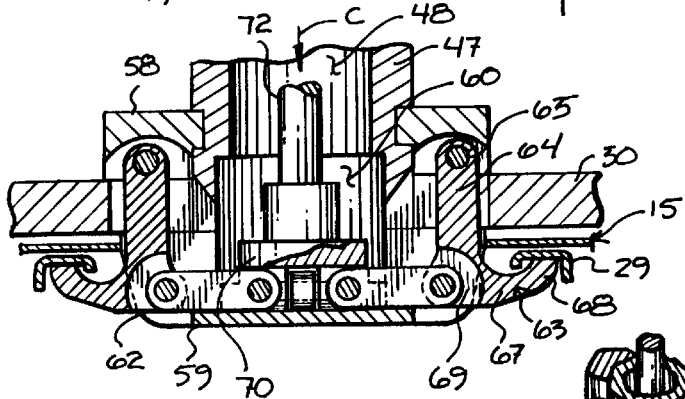
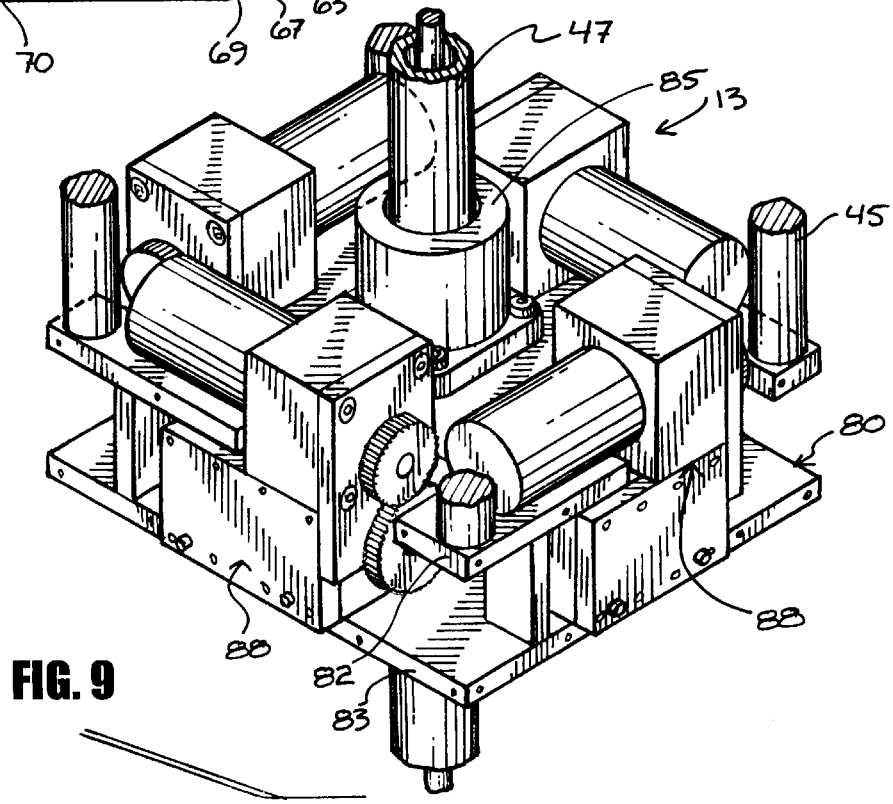

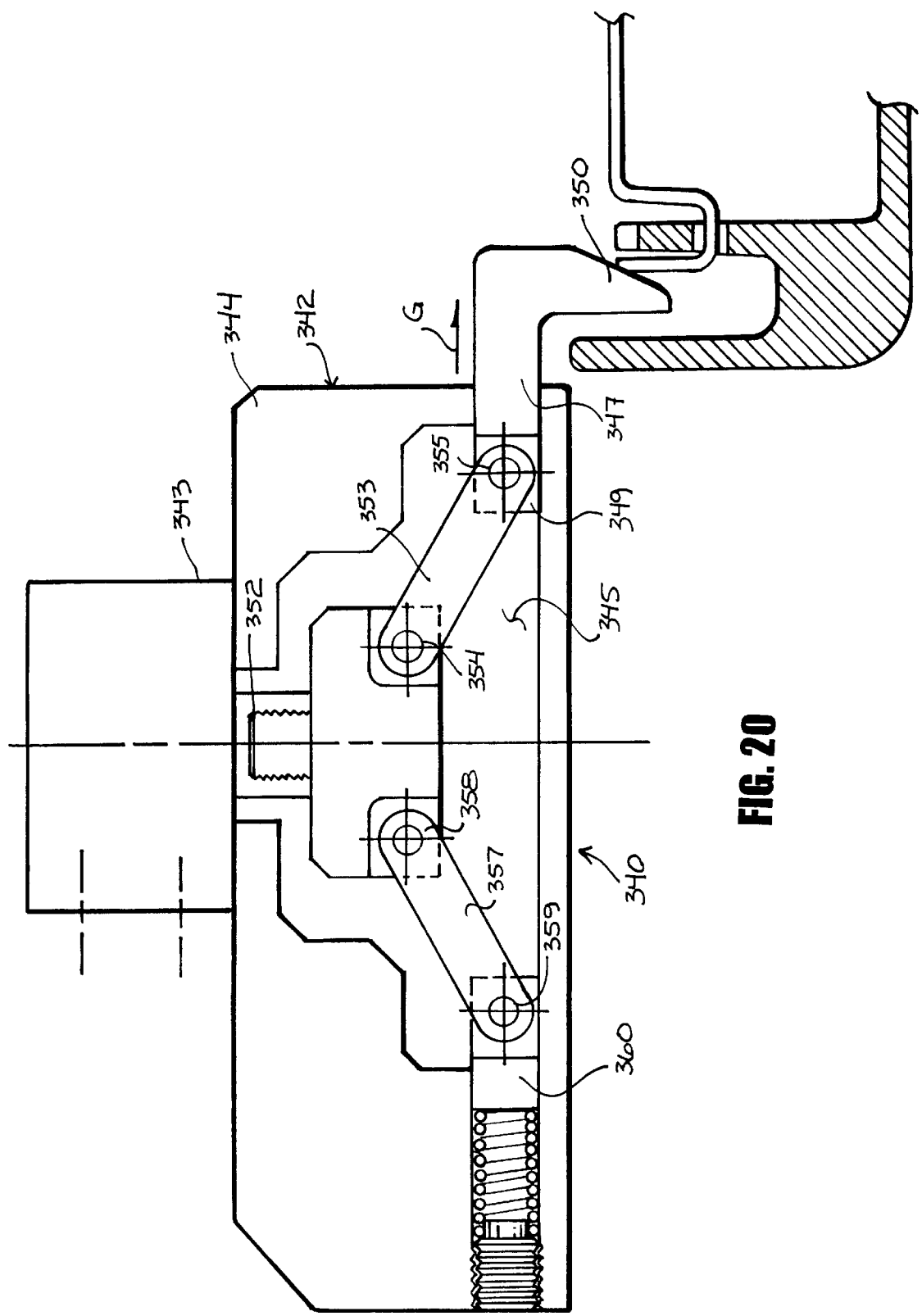

APPARATUS FOR CLINCHING REACTION PLATE TABS OF AIR BAG MODULES

This application is a continuation of application Ser. No. 08/262,915 filed 21 Jun. 1994 and now abandoned.

BACKGROUND OF THE INVENTION

1. Field of the Invention

This invention relates to automated apparatus for preparing air bag modules.

More particularly, the present invention relates to an automated apparatus for coupling a decorative cover to a reaction plate.

In a further and more specific aspect, the present invention concerns an automated apparatus for clinching tabs on a reaction plate so as to couple a decorative cover to the reaction plate.

2. The Prior Art

Since the development of air bags for use on automobiles, devices have been developed to simplify their production and to increase their quality and effectiveness. Originally, air bags were attached to a reaction plate and folded by hand. The air bag had to be folded into a compact bundle against the reaction plate, ready for installation in an automobile and deployment when necessary. Due to the labor intensive nature of the process, air bags were costly to provide on automobiles. Therefore automated devices have been developed to fold air bags less expensively then hand folding. An added benefit of the automated process is greater uniformity in the folded air bag. The uniformity of the folding process insures that all air bag function as desired. In other words, deviations in the fold patterns which may negatively effect deployment of the air bags are substantially eliminated, insuring better and more uniform deployment.

After an air bag has been folded against the reaction plate, a decorative cover is attached. The decorative cover helps protect the air bag and blend the assembly into the interior of the automobile. Currently, the decorative cover is riveted to the reaction plate. This is a very costly, time consuming process accomplished manually. A new method is being developed employing a reaction plate having tabs which are received through slots formed in the decorative cover. The tabs are then clinched to secure the decorative cover to the reaction plate. This method is simpler and less time consuming than using rivets, but still must be done manually. Conventional tab clinching devices consisting of linear rams and dies cannot be used to bend the tabs due to the configuration of the decorative cover. Again, as with manual folding of the air bags, manual clinching of the tabs is intrinsically non-uniform and is labor intensive, causing higher costs.

It would be highly advantageous, therefore, to remedy the foregoing and other deficiencies inherent in the prior art.

Accordingly, it is an object of the present invention to provide a new apparatus for coupling a decorative cover to a reaction plate of an air bag.

Another object of the present invention is to provide a new automated clinching apparatus.

And another object of the present invention is to provide an automated clinching apparatus for automatically attaching a decorative cover to a reaction plate of an air bag.

Still another object of the present invention is to uniformly clinch tabs on a reaction plate of an air bag.

Yet another object of the present invention is to automatically clinch tabs on a reaction plate of an air bag.

Yet still another object of the present invention is to provide an automated clinching apparatus being adjustable for altering clinch requirements.

A further object of the present invention is to provide an automated clinching apparatus capable of being altered to accommodate substantially any reaction plate.

SUMMARY OF THE INVENTION

Briefly, to achieve the desired objects of the present invention in accordance with a preferred embodiment thereof, provided is an automated clinching apparatus for securing a decorative cover to a reaction plate, forming an air bag module. The reaction plate includes a plurality of tabs received by the decorative cover and clinched to secure the decorative cover to the reaction plate. The automated clinching apparatus comprising a clamp assembly configured to engage and hold the air bag module, and a tab clinch assembly positioned adjacent the clamp assembly for automatically clinching the tabs of the reaction plate. The clamp assembly includes a base plate for receiving the reaction plate thereagainst, and a plurality of clamps carried by the base plate and movable between a retracted position and an extended position.

The tab clinch assembly includes a frame, and a plurality of tab clinch units coupled to the frame. Tab clinch units are positioned about the clamp assembly for clinching the tabs of the reaction plate. Each of the tab clinch units includes a housing coupled to the frame, a cam and die assembly carried by the housing, and drive means for operating the cam and die assembly. The cam and die assembly includes a cam shaft rotatably carried by the housing having a driven end coupled to the drive means and a free end, a plurality of cams carried by the cam shaft, a die pivot shaft carried by the housing adjacent the cam shaft, and a plurality of dies pivotally carried by the die pivot shaft, each of the plurality of dies having a yoke end configured to be engaged by a corresponding one of the plurality of cams for pivoting movement of the die, and a contact end.

The automated clinching apparatus further includes a framework rigidly supporting the tab clinch assembly, and supporting the clamp assembly in movable relationship with the tab clinch assembly. The framework includes a main support, a plurality of supports for rigidly supporting the tab clinch assembly to the main support, and a carriage supporting the clamp assembly. The carriage is slidably coupled to the main support.

Also provided is a method of attaching a decorative cover to a reaction plate to form an air bag module. The method includes the steps of providing a decorative cover having a plurality slots. Providing a reaction plate having a plurality of tabs received by the slots of the decorative cover. Providing a cam and die assembly having a housing carrying a cam shaft rotatable by drive means, a plurality of cams carried by the cam shaft, a die pivot shaft carried by the housing adjacent the cam shaft and a plurality of dies pivotally carried by the die pivot shaft, each of the plurality of dies having a yoke end configured to be engaged by a corresponding one of the plurality of cams for pivoting movement of the die, and a contact end. Positioning the air bag module proximate the cam and die assembly such that the dies are adjacent the tabs. Rotating the cam shaft to pivot the dies, the dies contacting and bending the tabs.

BRIEF DESCRIPTION OF THE DRAWINGS

The foregoing and further and more specific objects and advantages of the instant invention will become readily apparent to those skilled in the art from the following detailed description of a preferred embodiment thereof, taken in conjunction with the drawings, in which:

FIG. 1 is a perspective view of an automated clinching apparatus constructed in accordance with the teachings of the present invention, as it would appear prior to engaging an air bag module;

FIG. 2 is a perspective view of an air bag module, with the folded air bag and reaction plate broken away from the decorative cover;

FIG. 3 is a partial sectional view of the engagement between the tab of the reaction plate and the slot of the decorative cover, prior to clinching;

FIG. 4 is a side view of the automated clinching apparatus illustrating the movement of the clamping assembly;

FIG. 5 is an enlarged perspective view of the clamping assembly and the air bag module prior to engagement therebetween;

FIG. 6 is a sectional side view of the engagement between the clamping assembly and the air bag module prior to clamping;

FIG. 7 is an enlarged sectional side view of the clamping elements of the clamp assembly prior to clamping the reaction plate;

FIG. 8 is an enlarged sectional side view of the clamping elements of the clamp assembly as they would appear clamping the reaction plate;

FIG. 9 is a perspective view of the tab clinch assembly;

FIG. 20 is a sectional side view of a further embodiment of a clinch unit.

DETAILED DESCRIPTION OF THE PREFERRED EMBODIMENT

Figure 10:
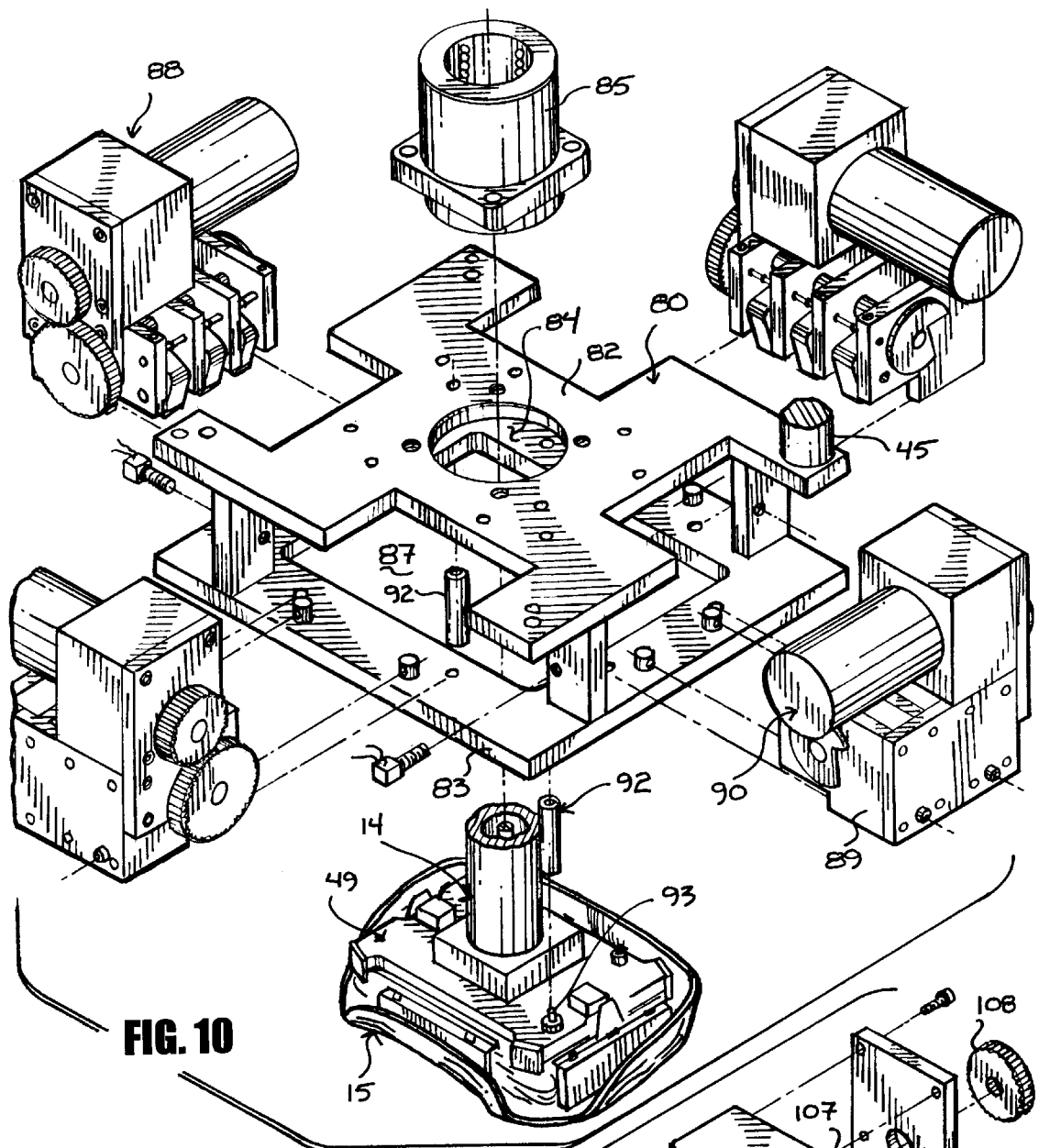
FIG. 10 is an exploded perspective view of the tab clinch assembly and includes the positioning of the clamp assembly clamping an air bag module.

Turning now to the drawings in which like reference characters indicate corresponding elements throughout the several views, attention is first directed to FIG. 1 which illustrates an automated clinching apparatus generally designated 10. Automated clinching apparatus 10 includes a framework 12 rigidly supporting a tab clinch assembly 13, and movably supporting a clamp assembly 14. Clamp assembly 14 functions to engage and clamp an air bag module 15, securing and positioning it for the clinching procedure provided by tab clinch assembly 13.

With reference to FIG. 2, air bag module 15 includes a folded air bag 17 coupled to a reaction plate 18, and a decorative cover 19. Reaction plate 18 includes a base plate 20 being generally planar and having an inner surface 22 and an outer surface 23. Partial sidewalls 24 extend from the edges of base plate 20, generally perpendicularly outward from inner surface 22. Flanges 25 extend outward from sidewalls 24 generally parallel to and outward from base plate 20 to support tabs 26 in a spaced apart parallel relationship with sidewalls 24. Reaction plate 18 further includes an inflation opening 27 formed through base plate 20 and datum surfaces 28 on outer surface 23. In reaction plate 18 as illustrated in FIG. 2, datum surfaces 28 are pins projecting from outer surface 23. As will be described in the ensuing description, datum surfaces 28 are used to properly align air bag module 15 in relation to clamp assembly 14 and thus also aligned with tab clinch assembly 13. Those skilled in the art will understand that different reaction plates used in different air bag module models will include different datum surfaces. Reaction plate 18 also includes a ring 29 (FIG. 6) coupled to inner surface 22 proximate and encircling inflation opening 27. Ring 29 secures air bag 17 to reaction plate 18, and is employed in the clamping process which will be described subsequently.

Decorative cover 19 covers air bag 17 and is secured to reaction plate 18. Decorative cover 19 includes an outer cover 30 having an inner surface 32 and an outer surface 33. Attachment members 34 extend substantially perpendicularly outward from inner surface 32 and correspond to sidewalls 24 of reaction plate 18. Slots 35 formed in attachment members 34 correspond to tabs 26. Reaction plate 18 is received within decorative cover 19 with air bag 17 between inner surface 32 of decorative cover 19 and inner surface 22 of reaction plate 18. With additional reference to FIG. 3, it can be seen that reaction plate 18 is positioned so that tabs 26 extend through slots 35. This places a portion 37 of decorative cover 19 between sidewalls 24 and tabs 26 of reaction plate 18. At this point, air bag module 15 is ready to be clinched, securing decorative cover 19 to reaction plate 18. It will be appreciated by those skilled in the art that air bag module 15 has been described for purposes of orientation and reference. Therefore, the description is intended to be generally representative of substantially all air bag modules having tabs.

Referring back to FIG. 1, with additional reference to FIG. 4, framework 12 includes a main support 38 being generally vertical, a horizontal support 39 coupled to the upper end of main support 38 and a movable carriage 40 carried by main support 38. Carriage 40 is moveable between a lowered position and a raised position along vertical rails 42 coupled to main support 38. An actuating motor 43 such as a pneumatic or hydraulic cylinder is coupled between carriage 40 and main support 38. Upon actuation, motor 43 moves carriage 40 from the lowered position to the raised position as indicated by double arrowed lines A in FIG. 4. Clamp assembly 14 is coupled to a horizontal portion 44 of carriage 40, and therefore is also moved between the lowered position and the raised position. Tab clinch assembly 13 is rigidly coupled to horizontal support 39 by posts 45. Framework 12 is intended to support tab clinch assembly 13 and clamp assembly 14, with clamp assembly 14 movable in relation to tab clinch assembly 13. One skilled in the art will understand that the framework is not crucial to the invention, and that other frameworks have been contemplated.

Clamp assembly 14 includes a tubular column 47 having an axial passage 48 therethrough, coupled to horizontal portion 44, slidably extending through tab clinch assembly 13, and terminating in a clamp fixture 49 configured to engage and clamp reaction plate 18. With additional reference to FIGS. 5 and 6, clamp fixture 49 includes a base plate 50 through which a central plug 52 extends. Column 47 is centrally coupled to base plate 50 with axial passage 48 in communication with plug 52. A rod 53 is slidably carried within passage 48 and moved between an extended position and a retracted position by an actuating motor 54 coupled to an end 55 thereof. Actuating motor 54, in this embodiment is a hydraulic or pneumatic cylinder carried by horizontal portion 44 (FIG. 4). The purpose for rod will be discussed below. To begin the clinching process, air bag module 15 is placed against base plate 50 such that plug 52 is received within inflation opening 27. Datum locators 57 formed in base plate 50 receive datum surfaces 28 of reaction plate 18, to insure proper orientation of air bag module 15. In this specific illustration, datum surfaces 28 are pins which are received in datum locators 57, apertures formed in base plate 50. As discussed previously, datum locators 57 may be altered to match datum surfaces on various different models of air bag modules.

Turning now to FIG. 7, plug 52 has an upper end 58, a lower end 59, and a central chamber 60. Column 47 is coupled to upper end 58 with passage 48 in communication with chamber 60. A plurality of slots 62 are spaced around the periphery of plug 52 communicating with chamber 60. A plurality of clamps 63 are carried within chamber 60 of plug 52 pivotally movable between a retracted position (FIG. 7) and an extended or clamping position (FIG. 8). In this embodiment, there are four slots 62 and clamps 63. This number, however, is not intended to be limiting, with more or less being possible. Clamps 63 are generally L-shaped, with a leg 64 terminating in a pivot end 65 pivotally coupled to plug 52 proximate upper end 58, a leg 67 terminating in a clamp end 68, and a junction 69 where the legs 64 and 67 of the L-shaped clamp 63 meet. A yoke 70 is slidably carried within chamber 60 and extends into passage 48 where it is coupled to an end 72 of rod 53. In this embodiment end 72 is threaded, and matingly engages corresponding threads of yoke 70. Links 73 are pivotally coupled between yoke 70 and junction 69. When rod 53 is moved to the retracted position in a direction indicated by arrowed line B, yoke 70 is pulled upward toward passage 48 and in turn pulls links 73 upward, pivoting clamp end 68 of clamps 63 inward about pivot end 65. In this unclamped position, an air bag module 15 may be removed or positioned as required.

Turning now to FIG. 8, upon properly positioning an air bag module 15 in engagement with clamp assembly 14, actuator motor 54 is caused to move rod 53 to the extended position in a direction indicated by arrowed line C. Rod 53 pushes yoke 70 downward, toward lower end 59 of plug 52. Links 73 are in turn, forced against junction 69, pivoting clamp end 68 outward about pivot end 65, through slots 62. When air bag module 15 is properly positioned, clamp ends 68 engage ring 29, clamping it firmly against base plate 50. At this point, air bag module 15 is securely coupled to clamp assembly 14.

Referring now to FIG. 9, tab clinch apparatus 13 includes a frame 80 having a top plate 82 and a bottom plate 83 coupled together in a spaced apart relationship. Top plate 82 has a central opening 84 through which column 47 extends. A bushing 85 is coupled to top plate 82 about opening 84 for slidably receiving column 47. Bottom plate 83 also includes a central opening 87 (FIG. 10) which is sized to receive clamp fixture 49 and air bag module 15 clamped thereto. Posts 45 extending from horizontal support 39 (not visible) are attached to corners of top plate 82. Four tab clinch units 88 are carried by frame 80 spaced about the periphery thereof for engagement with air bag module 15 when it is positioned within opening 87.

Referring now to FIG. 10, tab clinch units 88 consist of a cam and die assembly 89 and an electric motor 90. Motor 90 is coupled to and positioned above cam and die assembly 89 for operation thereof. Each tab clinch unit 88 is attached to frame 80 substantially between top plate 82 and bottom plate 83 with cam and die assembly 89 positioned adjacent opening 87. Each tab clinch unit 88 is furthermore positioned to one side of opening 87 such that they are positioned in opposing pairs across opening 87.

Still referring to FIG. 10, tab clinch assembly 13 further includes a pair of switches 92 which are altered upon proper positioning of clamp fixture 49 within opening 87. If air bag module 15 is misaligned in its engagement with clamp fixture 49, it may be damaged between frame 80 and clamp fixture 49. To prevent any damage to automatic clinching apparatus 10 or air bag module 15, carriage 40 is moved to the raised position with actuating motor 43 exerting a low force. When double acting cylinders are used, this force would be a low pressure. The pressure is low enough that air bag module 15 is not damaged. When air bag module 15 is properly aligned, it is received within opening 87 with clamp fixture 49 properly positioned. When clamp fixture 49 is properly positioned, a pair of pins 93 extending from outer surface 23 of base plate 20 engage a pair of switches 92 coupled to frame 80. When both switches 92 are engaged, actuating motor 43 exerts a greater force, securely holding air bag module 15 within opening 87. It will be understood that a wide variety of switches known to those skilled in the art will function in this capacity.

Figure 11:
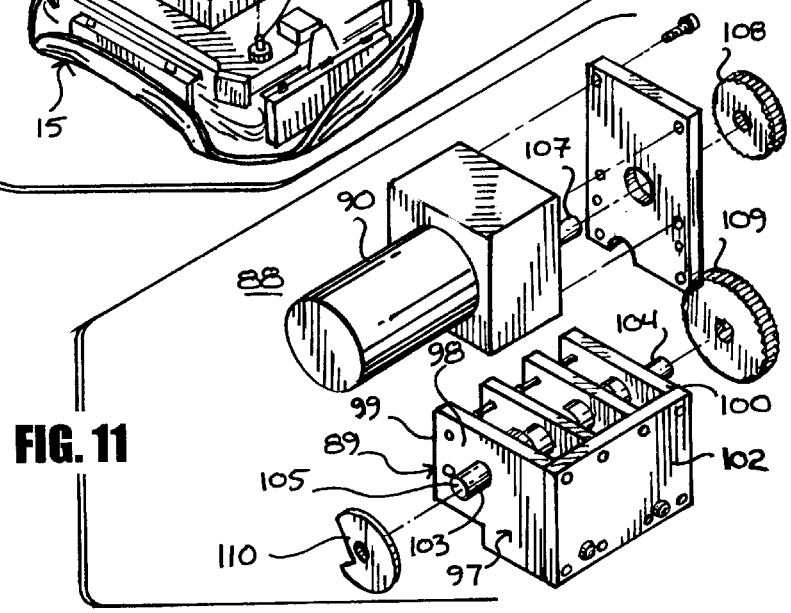
FIG. 11 is an exploded perspective view of a single tab clinch unit.

Tab clinch units 88 are illustrated in greater detail in FIG. 11. Only one will be described in detail since they are identical. Cam and die assembly 89 includes a housing 97 consisting of parallel walls 98 each having a free end 99 and an end 100 coupled to a transverse wall 102. A cam shaft 103 having a driven end 104 and a free end 105, rotatably extends through parallel walls 98 intermediate free ends 99 and transverse wall 102. Electric motor 90 having a drive shaft 107 is coupled to the top of housing 97. A drive gear 108 is coupled to drive shaft 107 and engages and drives a driven gear 109 coupled to driven end 104 of cam shaft 103. A proximity switch target 110, which will be discussed in detail below, is coupled to free end 105 of cam shaft 103.

Figure 12:
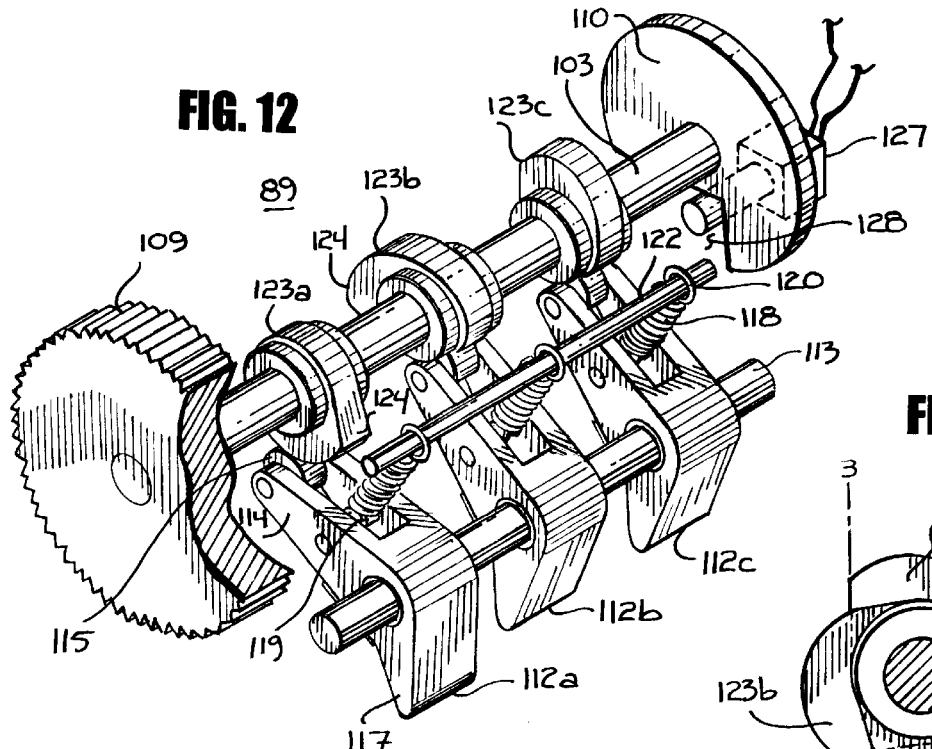
FIG. 12 is a perspective view of a cam and die assembly.
Figure 13:
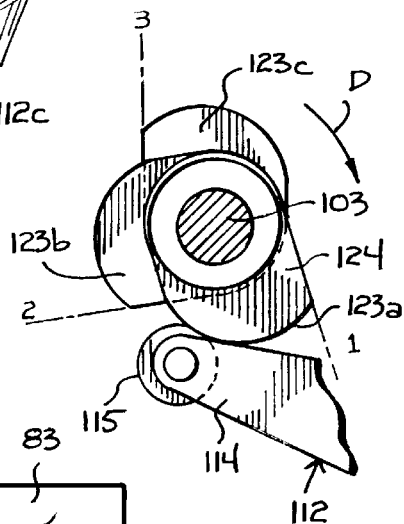
FIG. 13 is a partial side view of a cam and die assembly.

Turning now to FIG. 12, cam and die assemblies 89 each include three dies 112a, 112b and 112c, rotatably mounted on a die pivot shaft 113. Dies 112 each have a yoke end 114 which is bifurcated and carries a roller 115 between the furcations, and a contact end 117 extending substantially perpendicularly with respect to yoke end 114 and which engages tabs 26. Die pivot shaft 113 extends through dies 112 substantially intermediate yoke end 114 and contact end 115. A return spring 118 has an end 119 coupled to yoke end 114 intermediate roller 115 and pivot shaft 113, and an end 120 coupled to an anchor rod 122 extending through parallel walls 98 (FIG. 11). Cam and die assembly 89 further includes three cams 123a, 123b, and 123c corresponding to dies 112a, 112b, and 112c respectively. Each cam 123 has a lobe 124 and is mounted on cam shaft 103 between driven gear 109 and proximity switch target 110. Cams 123 are radially staggered on cam shaft 103 and positioned to engage rollers 115 of dies 112 one at a time as cam shaft 103 rotates. With additional reference to FIG. 13, it can be seen that as cam shaft 103 rotates, lobe 124 of cam 123a engage roller 115. As cam shaft 103 continues to rotate, lobe 124 of cam 123c engages roller 115 and subsequently lobe 124 of cam 123b engages roller 115. In this manner, dies 112 are operated sequentially. It will be understood that there are as many dies with corresponding cams as are necessary to match tabs in various models of air bag modules, and the quantity of three is used by way of example.

Figure 16:
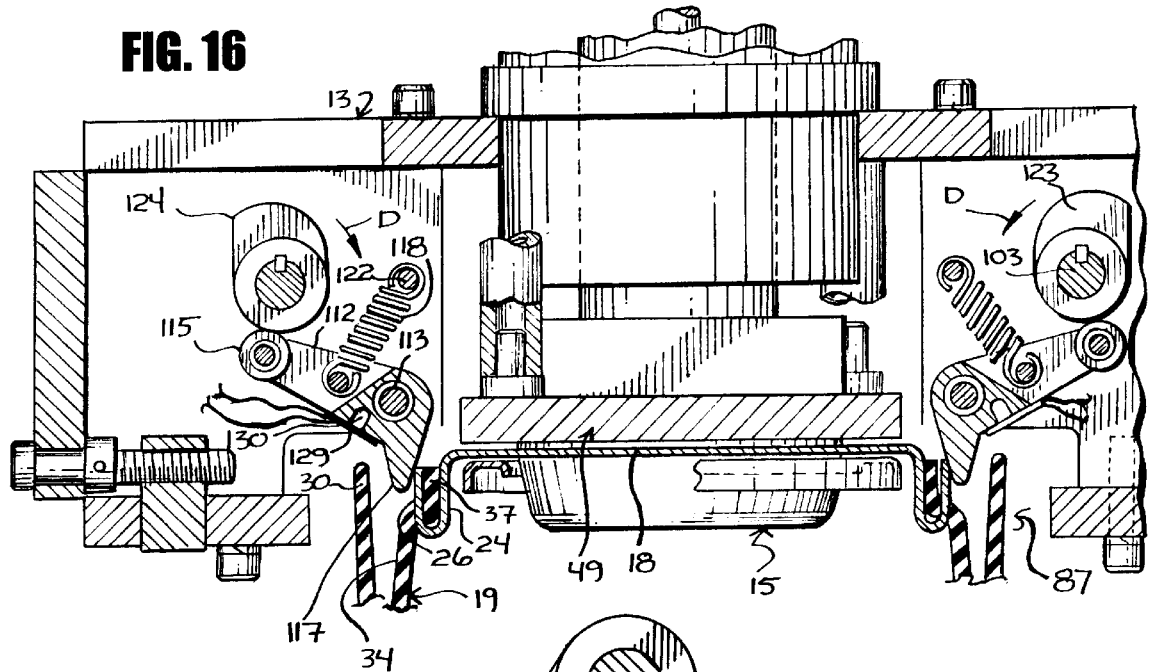
FIG. 16 is a side view of the clinch assembly and portions of the air bag module during clinching of the tabs, each with portions cut-away to illustrate hidden portions.

Turning now to FIG. 16, in operation, tab clinch assembly 13 forces tabs 26 inward toward sidewalls 24 of reaction plate 18 capturing portion 37 of decorative cover 19 between. To accomplish this, clamp assembly 114 raises air bag module 15 to a position within opening 87 such that contact ends 115 of dies 112 are positioned between outer cover 30 and attachment members 34. After being properly positioned, clamp assembly 14 securely retains air bag module 15 within opening 87 for clinching. Electric motors 90 then rotate cam shafts 103 rotating cams 123. As each cam 123 rotates in the direction indicated by arcuate arrowed lines D, lobes 124 of cams 123 engage respective rollers 115, forcing it downward. As dies 112 pivot about pivot shaft 113, contact ends 117 pivot inward, contacting and clinching tabs 26. After each lobe 124 rotates past roller 115, springs 118 returns dies 112 to the pre-clinch position. In this manner, each tab 26 is clinched, securely fastening decorative cover 19 to reaction plate 18.

Figure 14:
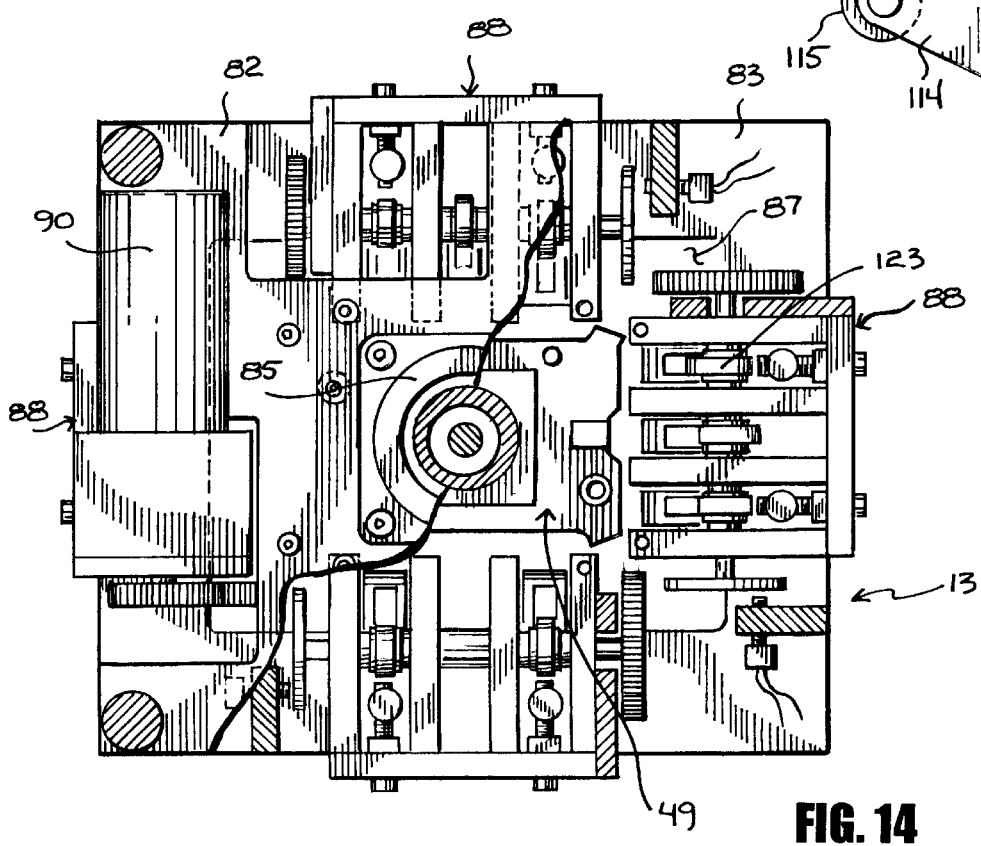
FIG. 14 is a top view of the tab clinch assembly with portions cut-away to illustrate hidden portions

Turning to FIG. 14, it can be seen that tab clinch units 88 are positioned in opposing pairs. Theoretically, each pair could operate together and cams 123 could be radially aligned so as to clinch all tabs 26 at one time. This however, would cause a great strain on reaction plate 18 potentially causing damage such as bowing thereof. To avoid subjecting reaction plate 18 to high amounts of stress, each pair of tab clinch units 88 operate alone. The first pair clinch tabs 26 on opposing sides of reaction plate 18, then the second pair clinch the remaining tabs. Adjacent units may also operate together as opposed to opposing units. This configuration, however, tends to place uneven pressure on one side of reaction plate 18 which may misalign air bag module and clamp fixture within opening 87. Finally, dies 112 within a tab clinch unit 88 operate sequentially to reduce the stress placed on reaction plate 18, and reduce the required output of motors 90 and the strength and therefore size of all the parts.

Figure 15:
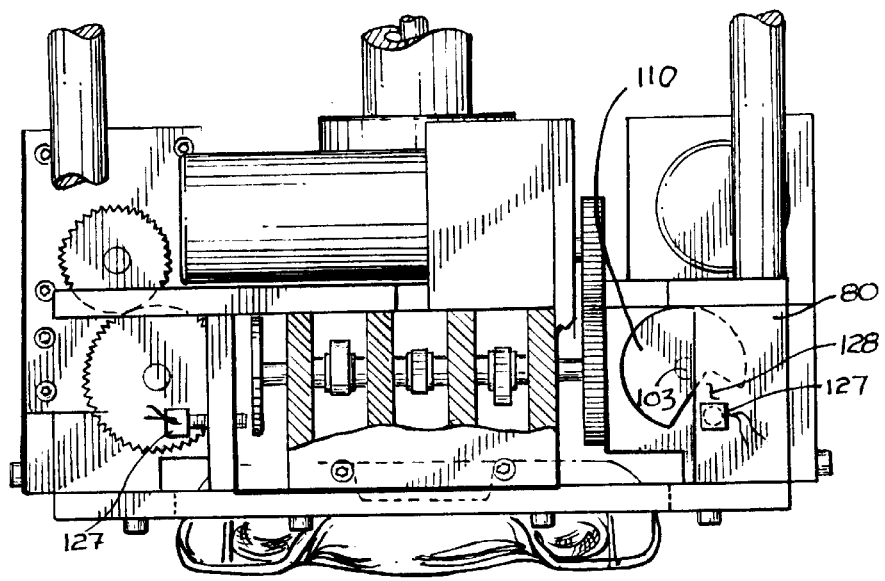
FIG. 15 is a side view of the clinch assembly with portions cut-away to illustrate hidden portions, and includes the positioning of the air bag module.

Referring back to FIG. 12, and with additional reference to FIG. 15, a proximity switch 127 is mounted to frame 80 proximate proximity switch target 110. Target 110 is a metal disk having an opening 128 where a section has been removed. Prior to clinching, opening 128 is adjacent proximity switch 127 with proximity switch 127 at a first state. Upon initiation of clinching, target 110 rotates with cam shaft 103 presenting the metal of target 110 to proximity switch 127 which is now at a second state. One complete rotation of cam shaft 103 will bring opening 128 adjacent proximity switch 127 again, changing it to the first state and indicating a complete revolution. In this manner the completion of the clinching procedure can be determined. Due to the resilience of tabs 26, it has been found that a better clinch occurs if two revolutions of cam shaft 103 are completed. The first revolution clinches tabs 26. However, there is some bounce back or return of tabs 26, therefore a second revolution is desired to complete the clinch. One skilled in the art will appreciate that this feature of the invention permits an adjustable number of revolutions. Therefore a single revolution may be used if it is sufficient to clinch tabs 26, or multiple revolutions if required.

Figure 17:
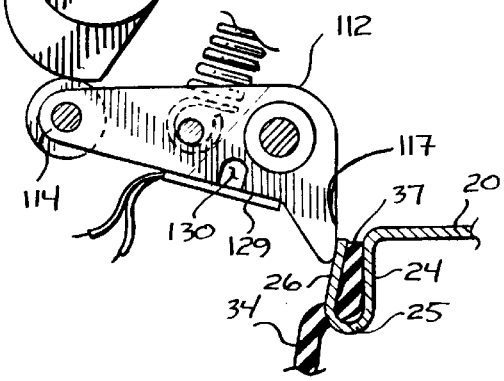
FIG. 17 is an enlarged side view illustrating a clinching die having a strain gauge, in the process of clinching a tab.

Turning now to FIGS. 16 and 17, an additional feature on automatic clinching apparatus 10 is a device for measuring the force applied to each tab 26. A strain gauge 129 is coupled to each die 112, spanning a notch 130 formed in die 112 intermediate yoke end 114 and contact end 117. When die 112 clinches tab 26, strain gauge 129 measures the deflection of die 112. The deflection measured can then be used to compute the force applied to tab 26 in a manner well known to those skilled in the art. The benefits of employing a strain gauge 129 are that reaction plates 18 having defective tabs 26 can be determined. If the force calculated does not fall within a predetermined window or range, the tab is defective. In other words, if the deflection measured on die 112 is less than desired, tab 26 was weak, being clinched to easily or was missing altogether. If the deflection was to great, tab 26 was again defective. In this manner the quality of each reaction plate 18 can be checked.

While not specifically shown, one skilled in the art will understand that the various actuators may be controlled by manual switches, or the various switches described coupled to control devices such a microprocessors or the like.

Figure 18:
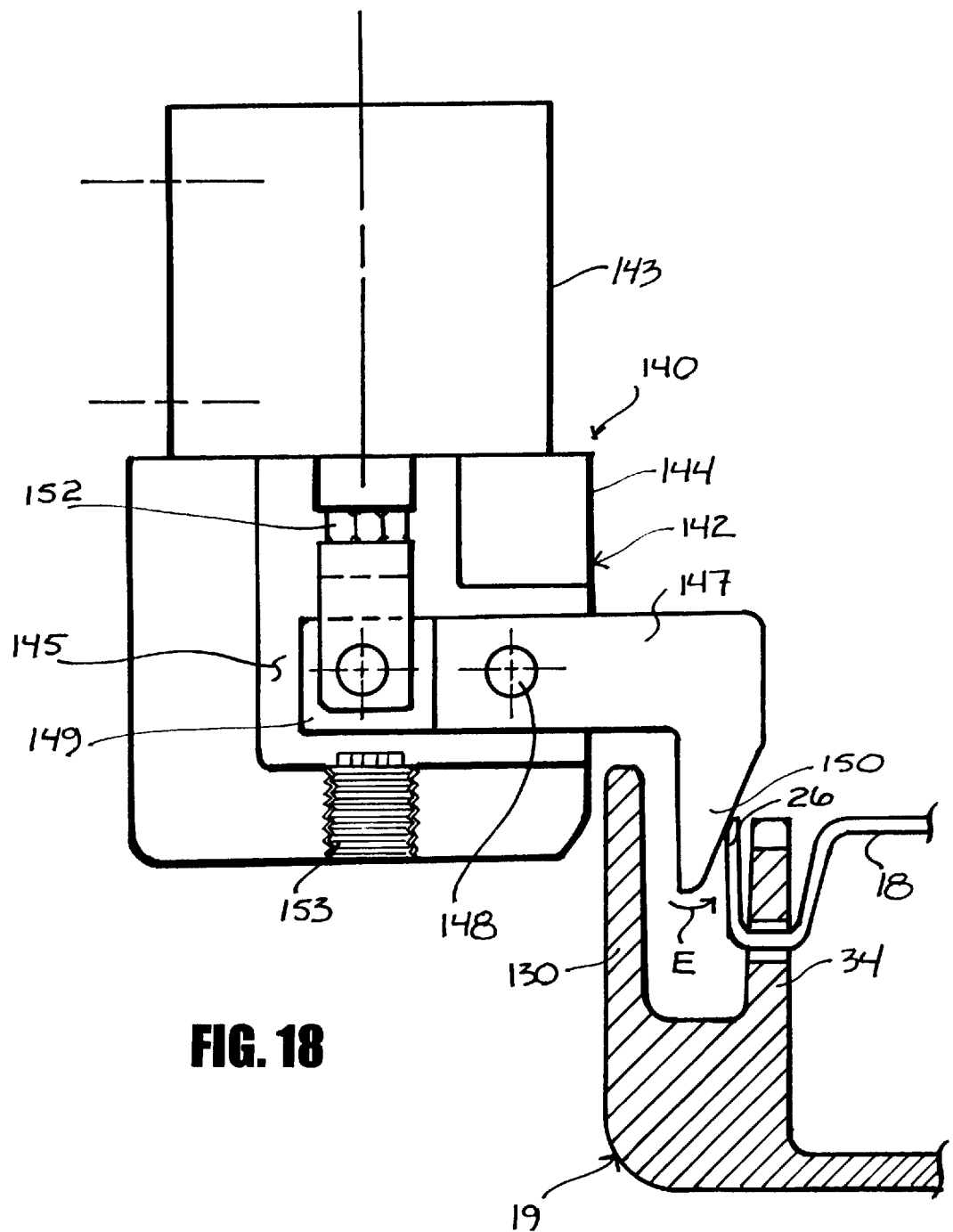
FIG. 18 is a sectional side view of another embodiment of a clinch unit.

Turning now to FIG. 18, a clinch unit 140 is illustrated. Clinch unit 140 would be used on automated clinching apparatus 10, as another embodiment, replacing tab clinch unit 88. A plurality of clinch units 140, preferably four, would be mounted onto frame 80 in substantially the same manner as tab clinch unit 88 and would not alter the operation of the rest of automated clinching apparatus 10. A single clinch unit 140 is illustrated since each is substantially identical.

Clinch unit 140 includes a die assembly 142 and a motor 143. Die assembly 142 consists of a housing 144 having an interior chamber 145, attachable to frame 80, and three generally L-shaped dies 147 rotatably mounted on a die pivot shaft 148 within chamber 145. Dies 147, of which only one is visible, each have an end 149 and a contact end 150 extending substantially perpendicularly with respect to end 149 and which engages tabs 26. Die pivot shaft 148 extends through dies 147 substantially intermediate end 149 and contact end 150. Contact end 150 of dies 147 extend from housing 144 to be received between outer cover 30 and attachment member 34 when air bag module 15 is raised into position by clamp assembly 14. In this embodiment, motor 143 is a double acting hydraulic or pneumatic cylinder mounted on housing 144. A reciprocating rod 152 extend into chamber 145 and is pivotally coupled to end 149 of die 147. Actuation of motor 143 drives reciprocating rod 152 between an extended and a retracted position. In the retracted position, dies 147 are in a rest configuration and ready to receive the air bag module 15. In the extended position, rod 152 pushes end 149 downward, pivoting die 147 about pivot shaft 148 thereby moving contact end 150 against tab 26 in a direction indicated by arcuate arrowed line E. After the clinch occurs, rod 152 is retracted pivoting contact end 150 away from die 147. A set screw 153 may be threaded through housing 144 below end 149 to permit adjustable restriction of the pivoting movement of die 147. It will be understood that there are as many dies 147 with corresponding motors 143 as are necessary to match tabs 26 in various models of air bag modules, and the quantity of three is used by way of example.

Figure 19:
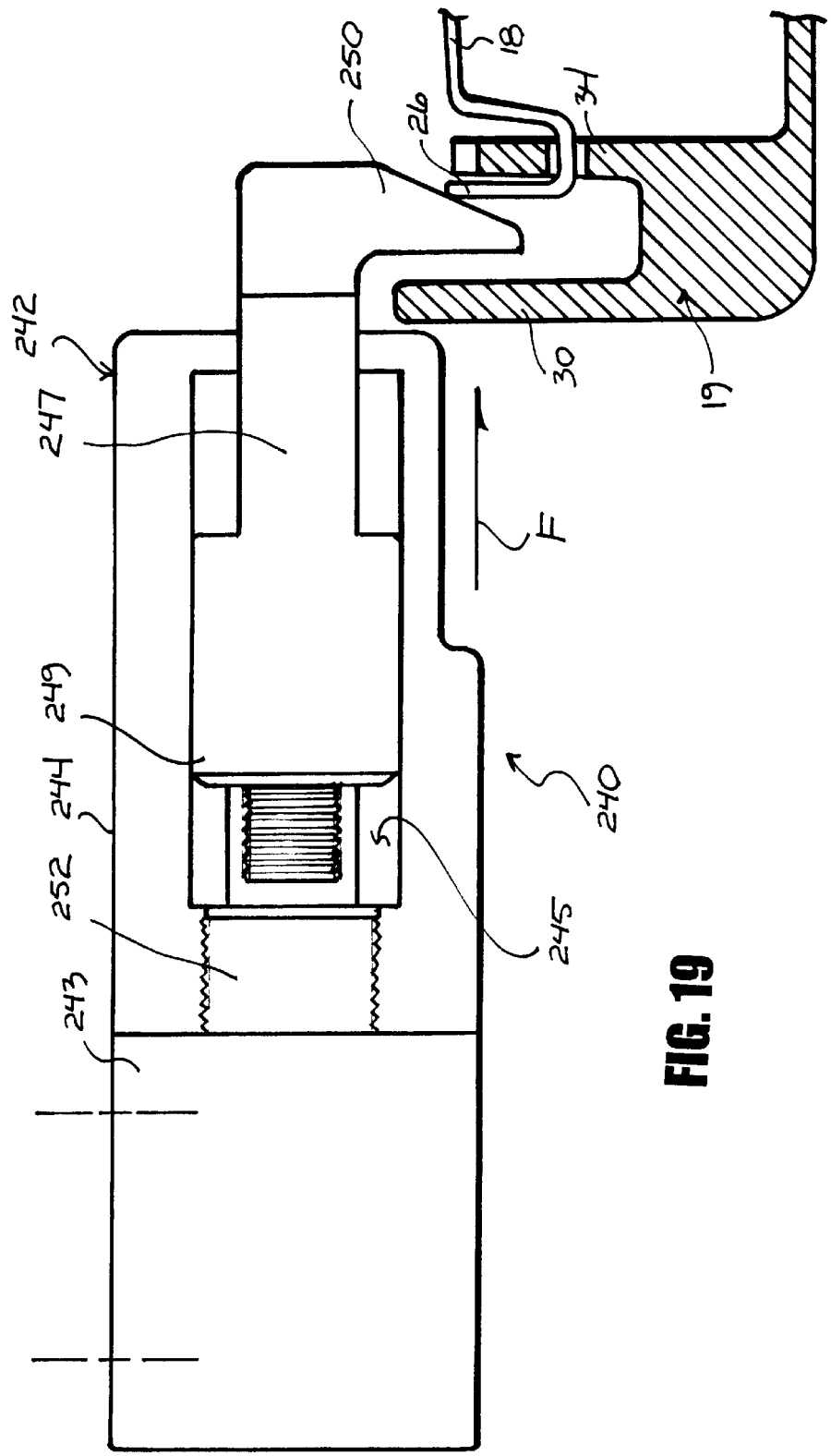
FIG. 19 is a sectional side view of yet another embodiment of a clinch unit.

Turning now to FIG. 19, a clinch unit 240 is illustrated. Clinch unit 240 would be used on automated clinching apparatus 10, as yet another embodiment, replacing tab clinch unit 88. A plurality of clinch units 240, preferably four, would be mounted onto frame 80 in substantially the same manner as tab clinch unit 88 and would not alter the operation of the rest of automated clinching apparatus 10. A single clinch unit 240 is illustrated since each is substantially identical.

Clinch unit 240 includes a die assembly 242 and a motor 243. Die assembly 242 consists of a housing 244 having an interior chamber 245, attachable to frame 80, and three generally L-shaped dies 247 mounted for reciprocating movement therein. Dies 247, of which only one is visible, each have an end 249 and a contact end 250 extending substantially perpendicularly with respect to end 249 and which engages tabs 26. Contact end 250 of dies 247 extend from housing 244 to be received between outer cover 30 and attachment members 34 when air bag module 15 is raised into position by clamp assembly 14. In this embodiment, motor 243 is a double acting hydraulic or pneumatic cylinder mounted to housing 244 adjacent end 249. A reciprocating rod 252 extends into chamber 245 and engages end 249 of die 247. Actuation of motor 243 drives reciprocating rod 252 between an extended and a retracted position. In the retracted position, dies 247 are in a rest configuration and ready to receive air bag module 15. In the extended position, rod 252 pushes end 249 in an outward direction indicated by arrowed line F, thereby moving contact end 250 against tab 26 in the same direction. After the clinch occurs, rod 252 is retracted, pulling contact end 250 away from die 247. It will be understood that there are as many dies 247 with corresponding motors 243 as are necessary to match tabs 26 in various models of air bag modules, and the quantity of three is used by way of example.

With reference to FIG. 20, a clinch unit 340 is illustrated. Clinch unit 340 would be used on automated clinching apparatus 10, as a further embodiment, replacing tab clinch unit 88. A plurality of clinch units 340, preferably four, would be mounted onto frame 80 in substantially the same manner as tab clinch unit 88 and would not alter the operation of the rest of automated clinching apparatus 10. A single clinch unit 340 is illustrated since each is substantially identical.

Clinch unit 340 includes a die assembly 342 and a motor 343. Die assembly 342 consists of a housing 344 having an interior chamber 345, attachable to frame 80, and three generally L-shaped dies 347 mounted for reciprocating movement therein. Dies 347, of which only one is visible, each have an end 349 and a contact end 350 extending substantially perpendicularly with respect to end 349 and which engages tabs 26. Contact end 350 of dies 347 extend from housing 344 to be received between outer cover 30 and attachment member 34 when air bag module 15 is raised into position by clamp assembly 14. In this embodiment, motor 343 is a double acting hydraulic or pneumatic cylinder mounted to housing 344 adjacent end 349. A reciprocating rod 352 extends into chamber 345 and is coupled to end 349 of die 347 by a link 353. An end 354 of link 353 is pivotally coupled to rod 352 and an opposing end 355 is pivotally coupled to end 349 of die 347. A second link 357 is coupled between rod 352 and a plunger member 360 reciprocally movable within chamber 345 in an opposing direction from die 347. Link 357 has an end 358 pivotally coupled to rod 352 and an opposing end 359 pivotally coupled to plunger member 360. Actuation of motor 343 drives reciprocating rod 352 between an extended and a retracted position. In the retracted position, dies 347 are in a rest configuration and ready to receive air bag module 15. In the extended position, rod 352 toggles link 353, forcing die 347 in an outward direction indicated by arrowed line G, thereby moving contact end 350 against tab 26 in the same direction. After the clinch occurs, rod 352 is retracted, toggling link 353 upward and retracting contact end 350 from die 347. Link 357 and plunger member 360 are employed to provide a counterbalance to die 347. This prevents the formation of uneven stresses upon rod 352. It will be understood that there are as many dies with corresponding motors as are necessary to match tabs in various models of air bag modules, and the quantity of three in this embodiment is used by way of example.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An automated clinching apparatus for use in combination with a decorative cover and a reaction plate, for securing the decorative cover to the reaction plate of an air bag module, the reaction plate including a plurality of tabs received by the decorative cover and clinchable to secure the decorative cover to the reaction plate, said automated clinching apparatus comprising:

a tab clinch assembly for receiving said air bag module and automatically clinching the tabs of the reaction plate;

a clamp assembly configured to engage the air bag module and move said module along a linear path into engagement with said tab clinch assembly; and said tab clinch assembly including:

a frame; and a plurality of tab clinch units coupled to said frame for clinching the tabs of the reaction plate, and positioned for receiving and engaging the air bag module, each including:

a housing coupled to said frame;

a die assembly carried by said housing, said die assembly having a plurality of dies, each having an end carried within said housing and coupled to said drive means and a contact end extendible from said housing and positioned to be received between the decorative cover and the reaction plate when said clamp assembly has moved along said linear path into engagement with said tab clinch assembly, said plurality of dies movable between a retracted position, allowing positioning of the air bag module by said clamp assembly, and an extended position, for engaging and clinching said tabs; and drive means for operating said die assembly.

2. The automated clinching apparatus as claimed in claim 1 wherein said clamp means includes:

a base plate for receiving the reaction plate thereagainst; and a plurality of clamps carried by said base plate, said plurality of clamps movable between a retracted position, allowing positioning of the reaction plate against said base plate, and an extended position, for engaging and securely retaining the reaction plate against said base plate.

3. The automated clinching apparatus as claimed in claim 2 wherein said clamp means further includes alignment means for properly aligning the coupled reaction plate and decorative cover in relation to said clamp means.

4. The automated clinching apparatus as claimed in claim 1 wherein said drive means includes:

a cam shaft rotatably carried by said housing, having a driven end coupled to a motor and a free end; and a plurality of cams carried by said cam shaft.

5. The automated clinching apparatus as claimed in claim 4 wherein said die assembly includes:

a die pivot shaft carried by said housing adjacent said cam shaft; and wherein said plurality of dies are pivotally carried by said die pivot shaft, and wherein said first end of each die is configured to be engaged by a corresponding one of said plurality of cams for pivoting movement of said die, and wherein said contact end of each die is configured to be receivable adjacent one of said plurality of tabs.

6. The automated clinching apparatus as claimed in claim 5 wherein said motor is coupled to said housing and includes:

a drive shaft; and coupling means coupling said drive shaft to said cam shaft.

7. The automated clinching apparatus as claimed in claim 1 wherein said drive means includes:

a plurality of motors;

a plurality of reciprocating rods coupled to said plurality of motors for movement between a retracted position and an extended position; and wherein said plurality of rods each has an end coupled to said first end of one of said plurality of dies for moving said dies between said extended position and said retracted position.

8. The automated clinching apparatus as claimed in claim 1 further including a framework rigidly supporting said tab clinch means, and supporting said clamp means in movable relationship with said tab clinch assembly.

9. The automated clinching apparatus as claimed in claim 8 wherein said framework includes:

a main support;

a plurality of supports for rigidly supporting said tab clinch means to said main support; and a carriage supporting said clamp means, said carriage slidably coupled to said main support.

10. An automated clinching apparatus in combination with a decorative cover and a reaction plate of an air bag module, the reaction plate including a plurality of tabs received by the decorative cover such that the reaction plate is coupled to the decorative cover, said automated clinching apparatus comprising:

a framework;

a tab clinch means rigidly supported by said framework for automatically clinching the tabs of the reaction plate to the decorative cover;

a clamp means movably mounted on said framework for engaging the reaction plate and moving the coupled reaction plate and decorative cover along a linear path between a lowered position and a raised position at which said clamp means is received by said tab clinch means;

with said tab clinch means including:

a frame having a central opening for receiving said clamp means in said raised position; and a plurality of tab clinch units coupled to said frame around a periphery of said central opening and extending beyond the periphery of said central opening, and positioned about said clamp means in said raised position, with each tab clinch unit including:

a housing coupled to said frame;

a plurality of dies carried by said housing, each of said plurality of dies having a first end carried within said housing and a contact end extendible from said housing; and drive means coupled to said first end for moving said dies from a retracted position in which the coupled reaction plate and decorative cover can be moved into engagement with said tab clinch means by said clamp means, to an extended position in which said dies engage and clinch said tabs of the reaction plate against said decorate cover.

11. The automated clinching apparatus as claimed in claim 10 wherein said drive means includes:

a cam shaft rotatably carried by said housing, having a driven end coupled to a motor and a free end; and a plurality of cams carried by said cam shaft.

12. The automated clinching apparatus as claimed in claim 11 wherein said die assembly includes:

a die pivot shaft carried by said housing adjacent said cam shaft; and wherein said plurality of dies are pivotally carried by said die pivot shaft, and wherein said first end of each die is configured to be engaged by a corresponding one of said plurality of cams for pivoting movement of said die, and wherein said contact end of each die is configured to be receivable adjacent one of said plurality of tabs.

13. The automated clinching apparatus as claimed in claim 12 wherein said motor is coupled to said housing and includes:

a drive shaft; and coupling means coupling said drive shaft to said cam shaft.

14. An automated clinching apparatus as claimed in claim 10 wherein said drive means includes:

a plurality of motors;

a plurality of reciprocating rods coupled to said plurality of motors for movement between a retracted position and an extended position; and wherein said plurality of rods each has an end coupled to said first end of one of said plurality of dies for moving said dies between said extended position and said retracted position.

15. The automated clinching apparatus as claimed in claim 10 wherein said clamp means includes:

a base plate for receiving the reaction plate thereagainst;

a plurality of clamps carried by said base plate and movable between a retracted position for receiving said reaction plate adjacent said base plate, and an extended position for clamping said reaction plate against said base plate; and a tubular column coupled to said base plate and extending through said opening of said frame.

16. The automated clinching apparatus as claimed in claim 21 wherein said framework further includes a movable carriage to which said column is coupled, wherein said carriage moves said clamp means along said column between the lowered position and the raised position in which said base plate is received within said opening.

17. The automated clinching apparatus as claimed in claim 21 wherein said clamp means further includes alignment means for properly aligning the coupled reaction plate and decorative cover in relation to said clamp means.

* * * * *